United States Patent
Steele

(10) Patent No.: US 9,758,013 B2
(45) Date of Patent: Sep. 12, 2017

(54) TRANSPORT REFRIGERATION SYSTEM WITH ENGINE SHAFT HORSEPOWER AUGMENTATION

(71) Applicant: Carrier Corporation, Farmington, CT (US)

(72) Inventor: John T. Steele, Marcellus, NY (US)

(73) Assignee: CARRIER CORPORATION, Farmington, CT (US)

( * ) Notice: Subject to any disclaimer, the term of this patent is extended or adjusted under 35 U.S.C. 154(b) by 519 days.

(21) Appl. No.: 14/366,750

(22) PCT Filed: Nov. 30, 2012

(86) PCT No.: PCT/US2012/067223
§ 371 (c)(1),
(2) Date: Jun. 19, 2014

(87) PCT Pub. No.: WO2013/095889
PCT Pub. Date: Jun. 27, 2013

(65) Prior Publication Data
US 2014/0345301 A1    Nov. 27, 2014

Related U.S. Application Data

(60) Provisional application No. 61/577,739, filed on Dec. 20, 2011.

(51) Int. Cl.
*B60P 3/20* (2006.01)
*F25D 11/00* (2006.01)
(Continued)

(52) U.S. Cl.
CPC ..... *B60H 1/00428* (2013.01); *B60H 1/00435* (2013.01); *B60H 1/3232* (2013.01); *B60P 3/20* (2013.01); *F25D 11/003* (2013.01)

(58) Field of Classification Search
CPC ............ B60H 1/00428; B60H 1/00435; B60H 1/3232; F25D 11/003; F25B 27/02; F25B 2327/00; F25B 2327/001; B60P 3/20
See application file for complete search history.

(56) References Cited

U.S. PATENT DOCUMENTS

| 4,123,910 A | 11/1978 | Ellison, Sr. |
| 5,997,259 A | 12/1999 | Marshall et al. |

(Continued)

FOREIGN PATENT DOCUMENTS

| DE | 1805984 U | 2/1960 |
| EP | 2025538 A1 | 2/2009 |

(Continued)

OTHER PUBLICATIONS

International Search Report for application PCT/US2012/067223, Mar. 13, 2015, 5 pages.

*Primary Examiner* — Jacob Amick
(74) *Attorney, Agent, or Firm* — Cantor Colburn LLP

(57) ABSTRACT

Shaft horsepower output associated with a prime mover for driving a component of a transport refrigeration system may be selectively augmented through an auxiliary power apparatus. In an embodiment, a compressed air engine is provided and selectively operable to augment the shaft horsepower output for driving the component. At least one storage tank is provided for storing compressor air and at least one air compressor is provided for generating and supplying compressed air to the at least one compressed air storage tank. In an embodiment, the prime mover is a fuel combustion engine and the compressed air is heated by exhaust gas from the fuel combustion engine. The driven component may be a refrigerant compressor. The driven component may be an electric generator.

11 Claims, 4 Drawing Sheets

(51) Int. Cl.
*B60H 1/00* (2006.01)
*B60H 1/32* (2006.01)

(56) References Cited

U.S. PATENT DOCUMENTS

| | | |
|---|---|---|
| 7,231,998 B1 | 6/2007 | Schechter |
| 2004/0237517 A1 | 12/2004 | Cho et al. |
| 2005/0166592 A1 | 8/2005 | Larson et al. |
| 2006/0218919 A1 | 10/2006 | Mitani et al. |
| 2007/0221145 A1 | 9/2007 | Forner et al. |
| 2009/0056331 A1 | 3/2009 | Zhao et al. |
| 2009/0259388 A1 | 10/2009 | Vetrovec |
| 2009/0314019 A1* | 12/2009 | Fujimoto ............. B60H 1/3222 62/228.5 |
| 2010/0095661 A1* | 4/2010 | Hemphill ................. B60K 6/12 60/327 |
| 2010/0139266 A1 | 6/2010 | Gerum |
| 2010/0282224 A1 | 11/2010 | Shapiro |
| 2011/0081257 A1 | 4/2011 | Kley et al. |
| 2011/0219766 A1 | 9/2011 | Marx et al. |

FOREIGN PATENT DOCUMENTS

| | | |
|---|---|---|
| EP | 2128545 A1 | 12/2009 |
| WO | 2004108463 A1 | 12/2004 |

* cited by examiner

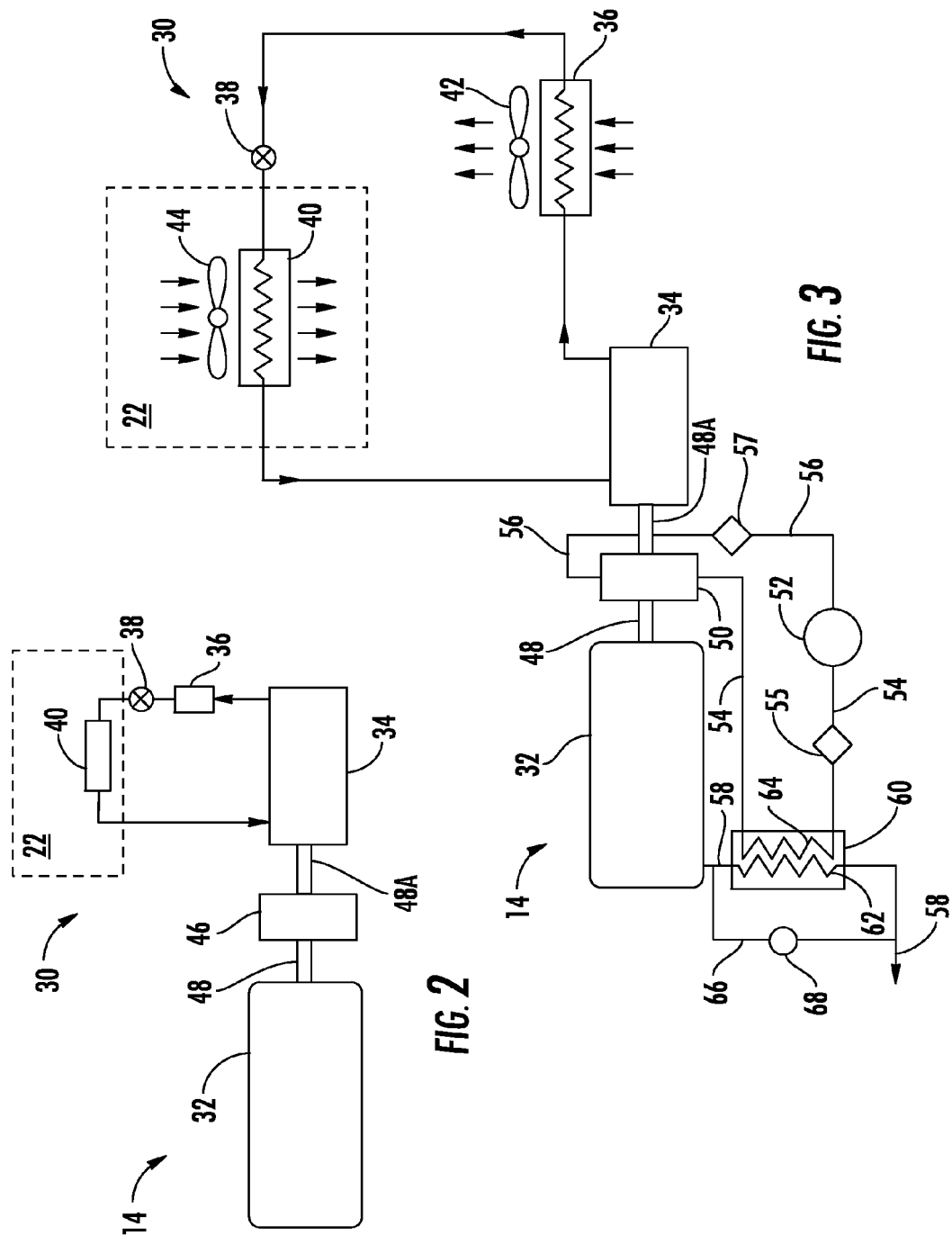

TRANSPORT REFRIGERATION SYSTEM WITH ENGINE SHAFT HORSEPOWER AUGMENTATION

CROSS-REFERENCE TO RELATED APPLICATION

Reference is made to and this application claims priority from and the benefit of U.S. Provisional Application Ser. No. 61/577,739, filed Dec. 20, 2011, and entitled TRANSPORT REFRIGERATION SYSTEM WITH ENGINE SHAFT HORSEPOWER AUGMENTATION, which application is incorporated herein in its entirety by reference.

BACKGROUND OF THE INVENTION

This invention relates generally to transport refrigeration systems for refrigerating perishable cargo in the cargo space of a trailer or other mobile refrigerated container and, more particularly, to shaft horsepower output augmentation of an onboard engine for powering a refrigerant compressor of a transport refrigeration unit.

Refrigerated trucks and trailers are commonly used to transport perishable cargo, such as, for example, produce, meat, poultry, fish, dairy products, cut flowers, and other fresh or frozen perishable products stowed in a temperature-controlled space, commonly referred to as the cargo box, within the truck or trailer. In the case of refrigerated trucks, a transport refrigeration system is mounted to the truck, typically behind the truck or on the roof of the truck for maintaining a controlled temperature environment within the cargo box of the truck. In the case of refrigerated trailers, which are typically pulled behind a tractor cab, a transport refrigeration system is mounted to the trailer, typically to the front wall of the trailer for maintaining a controlled temperature environment within the cargo box of the trailer.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo box by the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo box.

On commercially available transport refrigeration systems used in connection with refrigerated trucks and refrigerated trailers, the compressor, and typically other components of the transport refrigeration unit, must be powered during transit by a prime mover. In the case of refrigerated trailers, the prime mover typically comprises a diesel engine carried on and considered part of the transport refrigeration system. In mechanically driven transport refrigeration systems the compressor is directly driven by the diesel engine, either through a direct mechanical coupling or a belt drive, and other components, such as the condenser fan(s) and evaporator fan(s) are belt driven. A low voltage unit battery may also be provided to power electronic equipment, such as a system controller and other control system components, as well as lighting associated with the transport refrigeration system. An alternator, belt driven off the diesel engine, is typically provided for charging the low voltage unit battery.

In conventional practice, a transport refrigeration unit installed on a refrigerated truck or trailer operates in one of a temperature pull-down mode, a temperature maintenance mode, or a standstill mode. In the temperature pull-down mode, the refrigerant compressor, the condenser fan(s) and the evaporator fan(s) are operating with the refrigerant compressor generally operating at full capacity to lower the temperature within the cargo space as rapidly as possible to a desired set point temperature appropriate for the particular cargo stowed in the cargo space. In the temperature maintenance mode, the refrigerant compressor, the condenser fan(s) and the evaporator fan(s) are still operating, but the refrigerant compressor is operating at a significantly lower capacity so as to maintain the temperature in the cargo space within a specified range of the desired set point temperature and avoid over cooling. In the temperature maintenance mode, heaters associated with the evaporator may also be activated as necessary to warm the air passed through the evaporators by the evaporator fan(s) to prevent over cooling. In the standstill mode, the refrigerant compressor and the condenser and evaporator fans are off.

Diesel engines used as prime movers on transport refrigeration systems generally have two operating speeds, that is a high RPM speed, such as 2200 RPM, and a low RPM speed, such as 1400 RPM. In operation, the diesel engine is operated at high speed during temperature pull-down and other heavy refrigeration load conditions and at low speed during the temperature maintenance mode. During standstill, the diesel engine is typically idling at low speed. The diesel engine is generally designed to meet the power needs of the transport refrigeration unit during operation at maximum capacity, such as during the temperature pull-down mode, with efficient fuel consumption. Therefore, during the temperature maintenance mode and standstill mode, the diesel engine is operating at lower efficiency and with increased fuel consumption.

SUMMARY OF THE INVENTION

It would be desirable to reduce the shaft horsepower demand on the engine during operation of the transport refrigeration unit under maximum refrigeration hold conditions.

In an aspect, a transport refrigeration system for refrigerating a perishable cargo within a cargo space of a mobile refrigerated unit is disclosed that includes a refrigeration unit having a refrigerant compressor, an engine coupled to a drive shaft for driving the refrigerant compressor and operable to generate an available shaft horsepower output, and an auxiliary power apparatus operatively associated with the drive shaft for driving the refrigerant compressor and selectively operable to augment the available shaft horsepower output of the engine.

In an embodiment, the auxiliary power apparatus comprises a compressed air device selectively operable in a first mode as the compressed air engine and selectively operable in a second mode as an air compressor. A first compressed air conduit establishes air flow communication between an outlet of the at least one compressed air storage tank and an inlet to the compressed air device, and a second compressed air conduit establishes air flow communication between an outlet of the compressed air device and an inlet to the at least one compressed air storage tank.

In an aspect, a transport refrigeration system for refrigerating a perishable cargo within a cargo space of a mobile refrigerated unit is disclosed that includes a refrigeration unit having a refrigerant compressor, a fuel combustion engine, and an auxiliary power apparatus having a shaft coupled to the refrigerant compressor for driving the refrigerant compressor and operable to generate a shaft horsepower output; and a compressed air engine operatively associated with the engine shaft and selectively operable to augment the shaft horsepower output of the engine. At least one storage tank is provided for storing compressor air and at least one air compressor is provided for generating and supplying compressed air to the at least one compressed air storage tank. In an embodiment, the mobile refrigerated unit has a plurality of wheels and the at least one air compressor comprises at least one air compressor operatively associated with at least one wheel of the plurality of wheels, the at least one air compressor driven by a braking of the at least one wheel.

In an aspect, an engine exhaust to compressed air heat exchanger is provided wherein a supply of compressed air to be supplied to the compressed air engine is heated by a flow of exhaust gases generated by the fuel combustion engine. In an embodiment, a compressed air delivery conduit establishes air flow communication between the at least one compressed air storage tank and the compressed air engine, and an engine exhaust gas to compressed air heat exchanger is provided through which a flow of compressed air passing through the compressed air delivery conduit passes in heat exchange relationship with the engine exhaust gas. Alternatively, the engine exhaust gas to compressed air heat exchanger may be disposed in operative association with the at least one compressed air storage tank for heating the compressed air in-situ within the at least one compressed air storage tank.

In an embodiment, the at least one compressed air storage tank may comprise a plurality of compressed air storage tanks disposed in a parallel flow arrangement with respect to supplying compressed air to the compressed air engine, with an engine exhaust gas to compressed air heat exchanger provided in operative association with each tank of the plurality of compressed air storage tanks for heating the compressed air in-situ within each tank of the plurality of compressed air storage tanks. In an embodiment, the at least one compressed air storage tank may comprise a plurality of compressed air storage tanks including a primary compressed air storage tank connected by a compressed air delivery conduit in air flow communication to the compressed air engine and at least one secondary compressed air storage tank connected in air flow communication with the primary compressed air storage tank. In the latter embodiment, the at least one secondary compressed air storage tank may include an engine exhaust gas to compressed air heat exchanger arranged in association with the at least one secondary compressed air storage tank for heating compressed air in-situ within the at least one secondary compressed air storage tank.

In an aspect, a method is provided for augmenting a shaft horsepower output associated with a drive shaft of a fuel combustion engine for driving a component of a transport refrigeration system. The method includes providing a compressed air engine in operative association with the drive shaft of the fuel combustion engine for expanding compressed air to impart additional torque to the drive shaft of the fuel combusting engine and supplying heated compressed air to drive the compressed air engine. The method may also include supplying heated compressed air to the compressed air engine at a pressure in the range of about 1000 to about 2000 pounds per square inch (about 69 to about 138 bars) and at a temperature in the range of about 500° F. to about 600° F. (about 260° C. to about 316° C.).

BRIEF DESCRIPTION OF THE DRAWINGS

For a further understanding of the disclosure, reference will be made to the following detailed description which is to be read in connection with the accompanying drawing, where:

FIG. 2 is a schematic illustration of a transport refrigeration system having an engine driving a compressor of a transport refrigerant unit equipped with an auxiliary power apparatus for augmenting the shaft horsepower output of the engine;

FIG. 3 is a schematic illustration of an embodiment of a transport refrigeration system including a fuel combustion engine driving a compressor of a transport refrigeration unit and a compressed air device selectively operable in a first mode as a compressed air engine for augmenting the shaft horse power output of the fuel combustion engine and in a second mode as an air compressor;

DETAILED DESCRIPTION OF THE INVENTION

Figure 1:
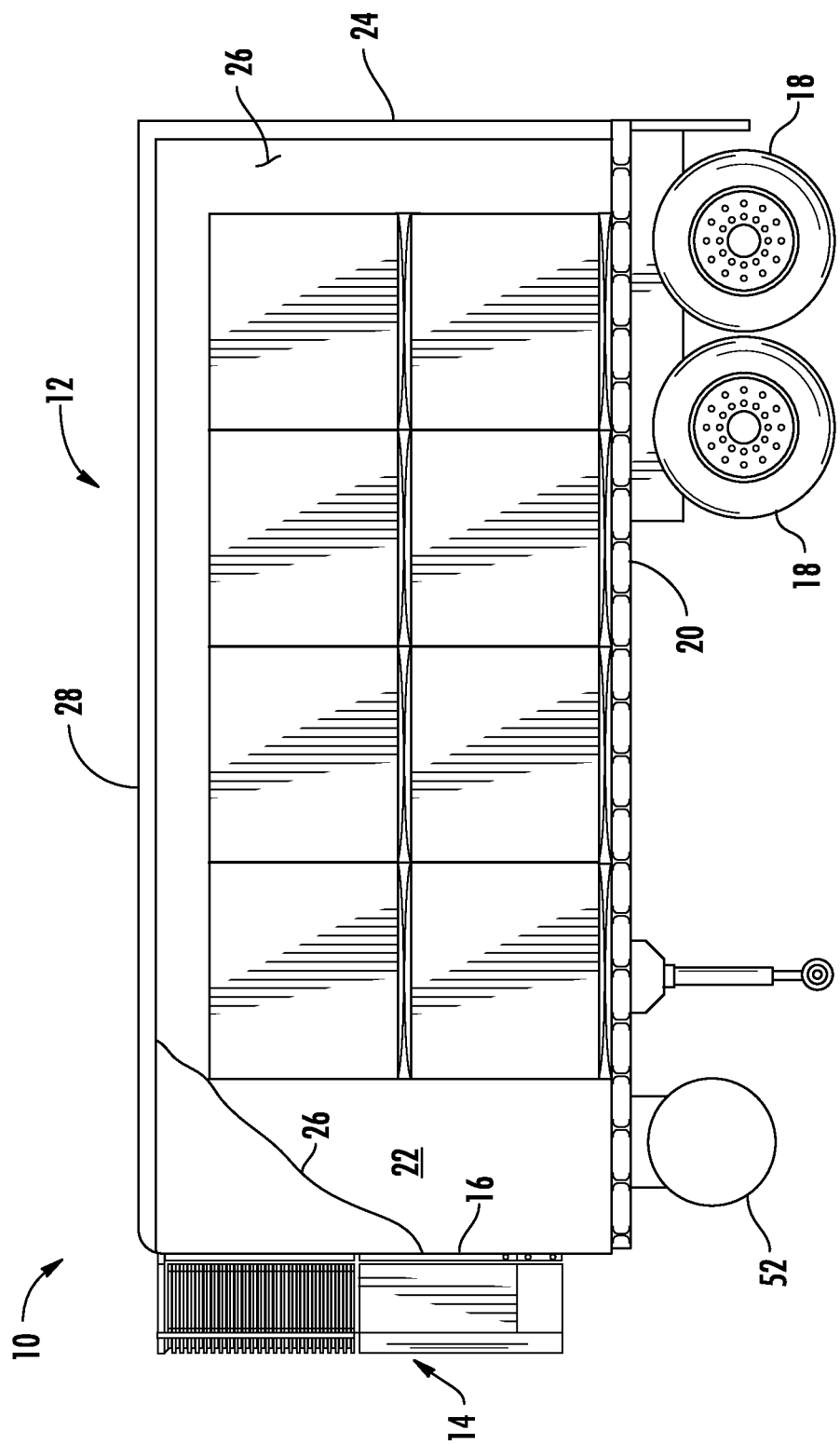
FIG. 1 is a side elevation view of a mobile refrigerated unit embodying the teachings of the disclosure.

Referring initially to FIG. 1, there is illustrated a mobile refrigerated unit, generally referenced 10, depicted as a refrigerated trailer 12, equipped with a transport refrigeration system 14 mounted as in conventional practice to a front wall 16 of the trailer 12. The trailer 12 is equipped with wheels 18 mounted beneath the trailer bed 20 so that the trailer can be drawn by a cab or tractor from place to place. A refrigerated cargo space 22 is defined within a cargo box defined by the front wall 16, a rear wall 24, a pair of side walls 26, the trailer bed 20 and a ceiling 28, all being of standard construction in the industry. A set of doors (not shown), typically mounted in the rear wall 24 of the cargo box, provided access to the refrigerated cargo space 22. The cargo box may be provided with appropriate seals, as in conventional practice, to prevent, or at least minimize, air from inside the refrigerated cargo space 22 escaping to the atmosphere outside the trailer 12 when the doors are closed. Perishable cargo, such as for example, fresh produce, meat, poultry, fish, dairy products, cut flowers, and other fresh or frozen perishable cargo, is loaded into the refrigerated cargo space 22 and stowed in the climate controlled environment established within the refrigerated cargo space 22 and maintained therein during transport by operation of the transport refrigeration system 14.

Figure 4:
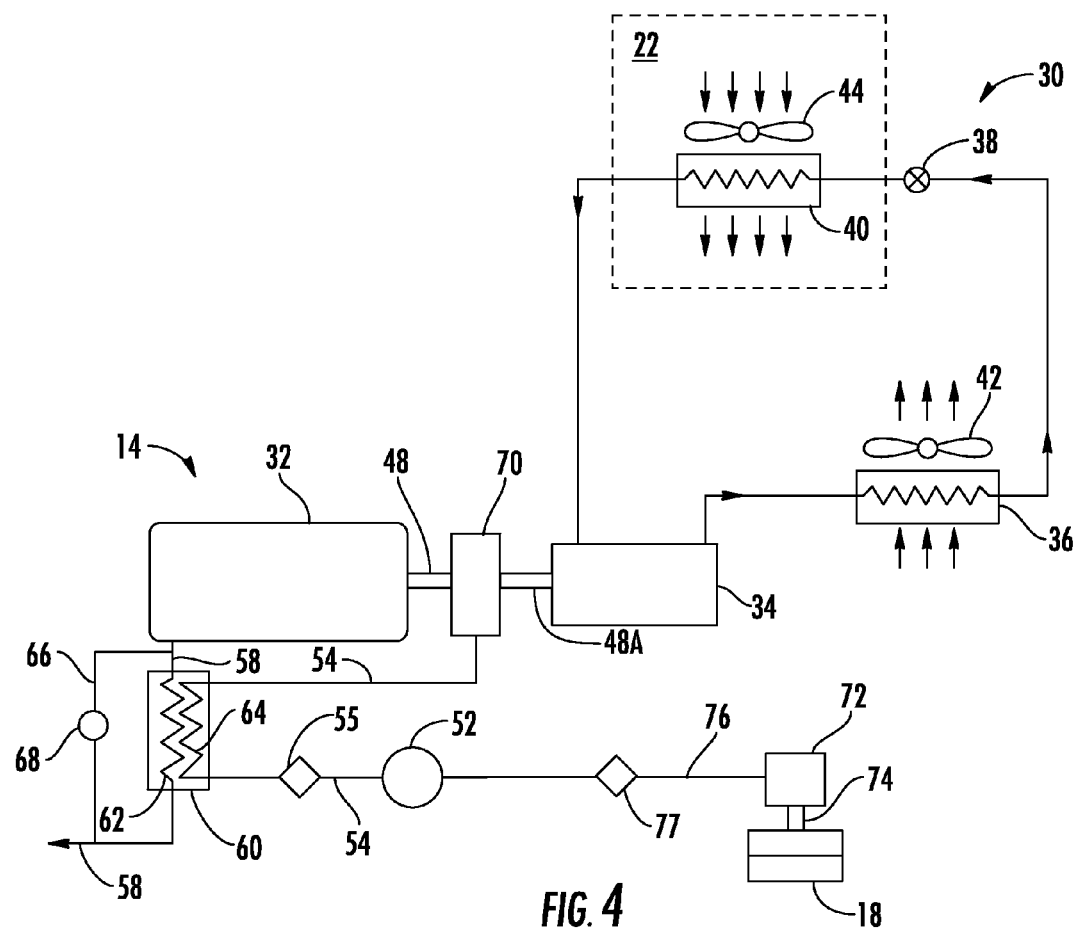
FIG. 4 is a schematic illustration of an embodiment of a transport refrigeration system including a fuel combustion engine driving a compressor of a transport refrigeration unit, a compressed air engine for augmenting the shaft horse power output of the fuel combustion engine, and an air compressor.

Referring now to FIGS. 2-4, the transport refrigeration system 14 includes a transport refrigeration unit 30 and an onboard fuel combustion engine 32, most commonly a Diesel engine. The transport refrigeration unit 30 includes a refrigerant compressor 34, a refrigerant heat rejection heat exchanger 36, an expansion device 38, and a refrigerant heat absorption heat exchanger 40 connected in refrigerant flow communication in a closed loop refrigerant circuit and arranged in a conventional refrigeration cycle. The transport refrigeration unit 30 also includes one or more fans 42 associated with the refrigerant heat rejection heat exchanger 36 and one or more fans 44 associated with the refrigerant heat absorption heat exchanger 40. It is to be understood that other components (not shown) may be incorporated into the refrigerant circuit as desired, including for example, but not limited to, a suction modulation valve, a receiver, a filter/dryer, an economizer circuit, a defrost circuit, an electric resistance defrost heater.

The refrigerant heat absorption heat exchanger 40, which functions as a refrigerant evaporator, is disposed within the cargo box of the trailer 12 and functions as a refrigerant evaporator and cools air drawn from the cargo space 22 by the fan(s) 44 and passed in heat exchange relationship with the refrigerant. The compressor 34, the refrigerant heat rejection heat exchanger 36 and the fuel combustion engine 32 are disposed externally with respect to the cargo box and the refrigerated cargo space 22. The refrigerant heat rejection heat exchanger functions as a refrigerant vapor condenser if the refrigerant unit 30 is operating in a subcritical refrigeration cycle and as a refrigerant vapor cooler if the refrigerant unit 30 is operating in a transcritical refrigeration cycle.

The compressor 34 is coupled to the drive shaft 48 so as to be driven by the fuel combustion engine 32. In the depicted embodiment, the compression mechanism (not shown) of the compressor 34 is connected by direct mechanical link to the drive shaft 48A coupled to the drive shaft 48 of the fuel combustion engine 32. However, it is to be understood that in other embodiments, the compression mechanism of the compressor 34 may be coupled to the drive shaft 48A by a belt drive or chain drive, or other mechanism so as to be driven by the fuel combustion engine 32. The compressor 34 may be a reciprocating compressor, a scroll compressor, or any other type of compressor having a compression mechanism that may be suitably driven by mechanical coupling to the fuel combustion engine 32. Additional components of the transport refrigeration unit 30, such as the fans 42 and 44, may also be powered off the drive shaft 48, typically through belt drive or chain drive. If the fans 42 and 44 are equipped with electric drive motors, an alternator (not shown) may be also be driven by the drive shaft 48, typically through a belt drive or chain drive, to generate electric current to power such motors as in conventional practice in the industry.

Referring now to FIG. 2, the transport refrigeration system disclosed herein further includes an auxiliary power apparatus 46 is disposed in operative association with the drive shaft 48A driving the compressor 34. In accordance with the disclosure hereof, when additional shaft horsepower beyond the then available shaft horsepower imparted by to the shaft 48 by the fuel combustion engine 32 is needed, the auxiliary power apparatus 46 may be operated to impart additional shaft horsepower to the drive shaft 48A driving the compressor 34. For example, in transport refrigeration applications, the refrigeration demand may exceed the refrigeration capacity of the transport refrigeration unit 30 available at the maximum shaft horsepower output available from the fuel combustion engine under the existing operating conditions. During those periods of excessive refrigeration capacity demand, such as during pull-down of the temperature of the cargo newly loaded into the cargo space 22, the auxiliary power apparatus 46 may be selectively operated to impart additional shaft horsepower to the drive shaft 48A driving the compressor 34, thereby enabling the transport refrigeration unit 30 to meet the excessive refrigeration capacity demand.

In the embodiment depicted in FIG. 3, the auxiliary power apparatus comprises a combined compressed air engine and air compressor 50, referred to herein as a compressed air device, operatively associated with the drive shaft 48 of the fuel combustion engine 32 and the drive shaft 48A driving the compressor 34. At least one comprised air storage tank 52, for storing a supply of compressed air is carried onboard, typically located remote from the fuel combustion engine 32, for example, but not limited to, carried beneath the trailer bed 20, such as illustrated in FIG. 1. The compressed air device 50 is selectively operable in a first mode as a compressed air engine and selectively operable in a second mode as an air compressor. When operating as an air engine, the compressed air device 50 expands compressed air delivered thereto form storage tank 52 to impart additional torque to the drive shaft 48A driving the compressor 34. A first compressed air conduit 54 establishes air flow communication between an outlet of the at least one compressed air storage tank 52 and an inlet to the compressed air device 50, and a second compressed air conduit 56 establishes air flow communication between an outlet of the compressed air device 50 and an inlet to the at least one compressed air storage tank 52.

A flow control valve 55 is disposed in the first compressed air conduit 54 and a flow control valve 57 is disposed in the second compressed air conduit 56. Each of the flow control valves 55, 57 may be selectively operated to open and close the first and second compressed air conduits 56 and 57, respectively, to the flow of compressed air therethrough. In an embodiment, the flow control valves 55, 57 may comprise solenoid valves having a first open position and a second closed position.

Whenever additional shaft horsepower above and beyond the then available shaft horsepower output of the drive shaft 48 of the fuel combustion engine 32 is needed to meet the power demand of the transport refrigeration unit 30, the flow control valve 55 may be positioned open and the compressed air device 50 may be activated and operated as a compressed air engine driven by compressed air delivered from the compressed air storage tank 52 through the first compressed air conduit 54 to impart additional shaft horsepower to the drive shaft 48A driving the compressor 34. When the shaft horsepower output of the fuel combustion engine 32 exceeds the power demand of the transport refrigeration unit 30, the flow control valve 57 may be positioned open and the compressed air device 50 may be activated and operated as an air compressor driven by the drive shaft 48 of the fuel combustion engine 32 to supply compressed air through the second compressed air conduit 56 to replenish the compressed air supply stored in the compressed air tank 52.

In the embodiment depicted in FIG. 4, the auxiliary power apparatus comprises a compressed air engine 70 operatively associated with the drive shaft 48A driving the compressor 34. Additionally, at least one air compressor 72, separate from the compressed air engine 70, is provided for supplying compressed air to the compressed air storage tank 52 through a third compressed air flow conduit 76. A flow control valve 77 is disposed in the third compressed air conduit 76 and may be selectively operated to open and close the compressed air conduit 76 to the flow of compressed air therethrough. In an embodiment, the flow control valve 77 may comprise a solenoid valve having a first open position and a second closed position.

Whenever additional shaft horsepower above and beyond the then maximum available shaft horsepower output imparted to the drive shaft 48 by the fuel combustion engine 32 is needed to meet the power demand of the transport refrigeration unit 30, the flow control valve 55 may be positioned open and the compressed air engine 70 may be activated and driven by compressed air delivered from the compressed air storage tank 52 through the first compressed air conduit 54 to impart additional shaft horsepower to the drive shaft 48A driving the compressor 34. The compressed air device 72 may be selectively operated, with the flow control valve 77 selectively positioned open, to supply compressed air through the second compressed air conduit 76 to replenish the compressed air supply stored in the compressed air tank 52.

In an embodiment, as depicted in FIG. 4, the air compressor 72 is operatively associated with the axle 74 on which the set of wheels 18 is mounted. In this embodiment, whenever the brakes (not shown) associated with the set of wheels 18 are applied, the braking energy is recovered and applied to drive the air compressor 70. Simultaneous with the application of the brakes, the flow control valve 77 is positioned open, and the compressed air generated by the air compressor 72 flows through the third compressed air conduit 76 into the compressed air tank 52.

In an aspect of the method disclosed herein for augmenting the shaft horsepower output associated with a drive shaft 48 of a fuel combustion engine 32 for driving a component of a transport refrigeration system, such as for example the refrigerant compressor 34, in addition to providing the compressed air device 50 for expanding compressed air to impart additional torque to the drive shaft 48A driving the compressor 34, the method includes supplying heated compressed air to drive the compressed air device 50 as a compressed air engine. The method may also include supplying heated compressed air to the compressed air device 50 at a pressure in the range of about 1000 to about 2000 pounds per square inch (about 69 to about 138 bars) and at a temperature in the range of about 500° F. to about 600° F. (about 260° C. to about 316° C.).

In a further aspect of the method disclosed herein, the compressed air supplied to the compressed air device 50 when operating as a compressed air engine and to the compressed air engine 70 may be heated by heat absorbed from a flow of exhaust gas from the fuel combusting engine 32. In the embodiments depicted in FIGS. 3 and 4, the flow of compressed air passing through the first compressed air conduit 54 is passed in heat exchange relationship with a flow of engine exhaust gas passing from the fuel combustion engine 32 through the exhaust gas conduit 58. In the embodiments depicted in FIGS. 5-7, the compressed air is heated in-situ within the compressed air storage tanks by heat absorbed from a flow of exhaust gas from the fuel combustion engine 32.

Referring again to FIGS. 3 and 4, in the embodiments depicted therein, the transport refrigeration system 14 further includes an engine exhaust gas to compressed air heat exchanger 60. The engine exhaust gas to compressed air heat exchanger 60 includes an exhaust gas pass 62 interdisposed in the exhaust gas conduit 58 and a compressed air pass 64 interdisposed in the first compressed air flow conduit 54. The exhaust gas pass 62 and the compressed air pass 64 are disposed in heat exchange relationship whereby heat is transferred from the engine exhaust gas flowing through the exhaust conduit 58 to the compressed air flowing through the first compressed air conduit 54. The heated compressed air having traversed the compressed air pass 64 continues through the first compressed air flow conduit 54 to drive the compressed air engine (i.e. the compressed air device 50 in FIG. 3 when operating as a compressed air engine and the compressed air engine 70 in FIG. 4).

The cooled engine exhaust gas having traversed the exhaust gas pass 62 continues through the exhaust conduit 58 to pass through a muffler (not shown) and a particulate filter (not shown) prior to discharge to the atmosphere. Additionally, a bypass line 66 connects with the exhaust gas conduit 58 at a location upstream with respect to engine exhaust gas flow of the heat exchanger 60 and connects back with the exhaust gas conduit 58 at a location downstream with respect to engine exhaust gas flow of the heat exchanger 60, thereby providing an exhaust gas bypass around the heat exchanger 60. A bypass flow control valve 68, for example a solenoid valve being selectively positionable between at least an open position and a closed position, is disposed in the bypass line 66 for controlling the flow of engine exhaust gas through the bypass line 66. When the compressed air engine is not operating, the bypass flow control valve 68 is positioned open to permit all of the engine exhaust gas to flow through the bypass line 66 thereby bypassing the engine exhaust gas to compressed air heat exchanger 60. When the compressed air engine is operating, the bypass flow control valve 68 is positioned closed, whereby the engine exhaust gas passes through the exhaust gas pass 62 of the heat exchanger 60 thereby heating the compressed air passing through the compressed air pass 64 of the heat exchanger 60 and the first compressed air conduit 54.

Figure 5:
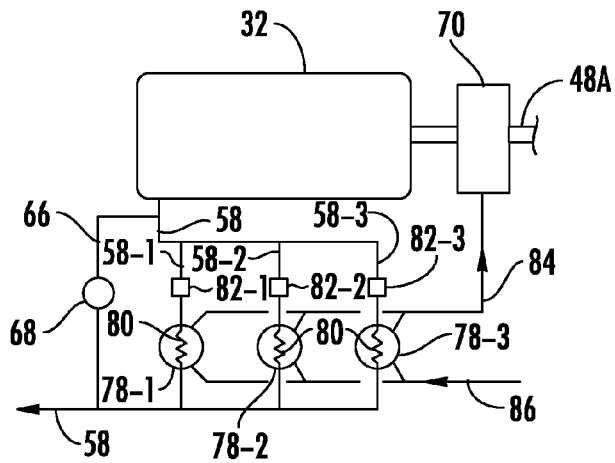
FIG. 5 is a schematic illustration on an embodiment of a compressed air supply system having multiple compressed air storage tanks with engine exhaust gas heating of the compressed air in-situ in the compressed air tanks.
Figure 6:
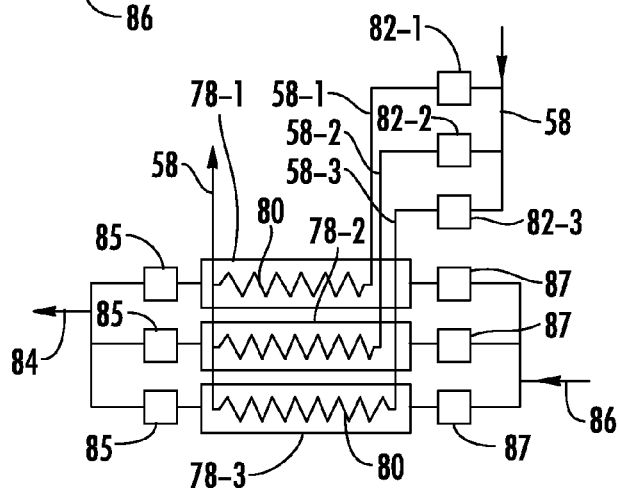
FIG. 6 is a further schematic illustration of the compressed air supply system of FIG. 5.

Referring now to FIGS. 5 and 6, an embodiment of a compressed air heating system is depicted wherein compressed air stored in a plurality of compressed air storage tanks 78-1, 78-2, 78-3 is heated in-situ within the compressed air storage tanks. Compressed air is supplied to each of the compressed air storage tanks 78-1, 78-2, 78-3 through compressed air conduit 86, heated in-situ within each of the compressed air tanks, and delivered therefrom through compressed air conduit 84 to the compressed air engine 70 to drive the compressed air engine 70 when the compressed air engine is operated. A flow control valve 85 may be disposed in each branch of the compressed air conduit 84 to control the flow of heated compressed air from each compressed air tank independently of the other compressed air tanks. A flow control valve 87 may be disposed in each branch of the compressed air conduit 86 to control the flow of compressed air being supplied to each of the compressed air tanks 78-1, 78-2, 78-3. Each of the flow control valves 85, 87 may be selectively operated to open and close any of the branches of the compressed air conduits 86 and 87, respectively, to the flow of compressed air therethrough to the compressed air tanks 78-1, 78-2, 78-2, independently of other branches. In an embodiment, the flow control valves 85, 87 may comprise solenoid valves having a first open position and a second closed position.

To heat the compressed air stored in the compressed air tanks 78-1, 78-2, 78-3, engine exhaust gas from exhaust gas conduit 58 is distributed amongst the plurality of branch lines 58-1, 58-2, 58-3. Each branch line includes a compressed air heat exchanger 80 disposed in operative association with a respective one of the compressed air storage tanks 78-1, 78-2, 78-3. A flow control valve 82 is disposed in each of the exhaust branch lines 58-1, 58-2, 58-3 upstream of the heat exchanger 80 for controlling the flow of engine exhaust gas through each of the branch lines 58-1, 58-2, 58-3 independently of the other branch lines. Each of the flow control valves 82 may comprise a solenoid valve having a first open position and a second closed position. Additionally, an exhaust gas bypass line 66 and a bypass flow control valve 68, as described herein before with respect to the embodiments depicted in FIGS. 3 and 4, is provided. The compressed air within one or more of the compressed air tanks 78-1, 78-2, 78-3 may be heated by selectively opening the flow control valves 82-1, 82-2, 82-3 disposed, respectively, in the branch line or lines 58-1, 58-2, 58-3 associated with the compressed air storage tank or tanks 78-1, 78-2, 78-3 in which the compressed air to be heated is disposed. Engine exhaust gas passes through each branch line 58-1, 58-2, 58-3 wherein the respective flow control valve 82-1, 82-2, 82-3 disposed therein is positioned open and traverses the engine exhaust gas to compressed air heat exchanger 80 to pass in heat exchange relationship with the compressed air stored therein.

Figure 7:
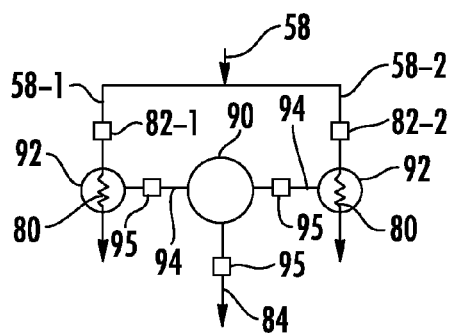
FIG. 7 is a schematic illustration of another embodiment of a compressed air supply system having multiple compressed air storage tanks with engine exhaust gas heating of the compressed air in-situ in the compressed air tanks.

Referring now to FIG. 7, an embodiment of a multiple compressed air storage tank system is depicted having a primary compressed air storage tank 90 and a plurality of secondary compressed air storage tanks 92. The primary compressed air storage tank 90 has a larger storage capacity relative to each of the secondary compressed air storage tanks 92. Each of the plurality of the secondary compressed air storage tanks 92 is supplied with compressor air from an on board compressed air source, for example from the compressed air device 50 when operating as an air compressor (FIG. 3) or from the air compressor 72 (FIG. 4). Each of the plurality of secondary compressed air storage tanks 92 has an outlet connected in flow communication by a line 94 with an inlet to the primary compressed air storage tank 90. A flow control valve 95 is disposed in each line 94 for selectively opening and closing the lines 94 to flow of compressed air from the secondary compressed air storage tanks 92 to the primary compressed air storage tank 90. The outlet of the primary compressed air storage tank 90 is connected through compressed air conduit 84 to the compressed air engine. An engine exhaust gas to compressed air heat exchanger 80 is operatively associated with each of the secondary compressed air storage tanks 92 for passing engine exhaust gas in heat relationship with the compressed air stored therein in-situ.

Compressed air is supplied form one or more air compressors to each of the plurality of secondary compressed air storage tanks 92, heated in-situ by engine exhaust gas as described hereinbefore. Compressed air is passed from the secondary compressed air storage tanks 92 to fill the primary compressed air storage tank 90 to a desired operating pressure. Once the primary compressed air storage tank 90 is at capacity, the secondary compressed air storage tanks 92 are filled to the same desired operating pressure. When the compressed air engine (i.e. the compressed air device 50 in FIG. 3 when operating as a compressed air engine and the compressed air engine 70 in FIG. 4) is operating, heated compressed air is supplied to the compressed air engine directly from the primary compressed air storage tank 90 and heated compressed air is simultaneously supplied to the primary compressed air storage tank 90 from one or more of the secondary compressed air storage tanks 92 to replenish that primary compressed air storage tank 90. As the secondary compressed air storage tanks 92 are drawn down, additional compressed air may be supplied thereto from one or more associated air compressors and heated in-situ.

Figure 8:
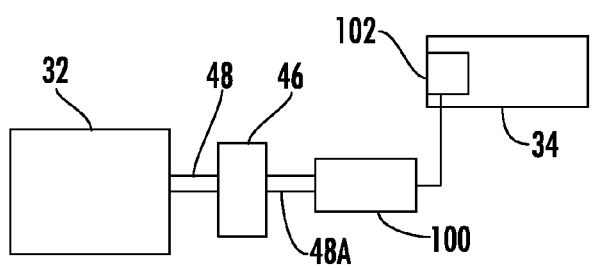
FIG. 8 is a schematic illustration of a transport refrigeration system having an engine driving an electric generator of a transport refrigerant unit equipped with an auxiliary power apparatus for augmenting the shaft horsepower output of the engine.

The auxiliary power apparatus disclosed herein may also be applied on transport refrigeration systems wherein the fuel combustion engine 32, rather than directly driving the refrigerant compressor 34 as illustrated in FIG. 2, directly drives an electric generator that generates electric current for powering an electric compressor drive motor associated with the refrigerant compressor. Referring to FIG. 8, a transport refrigeration system is illustrated schematically that includes a refrigerant unit having a refrigerant compressor 34 having an electric drive motor 102, an electric generator 100 that generates electric current for powering the electric drive motor of the refrigerant compressor, an engine 32 operable to impart an available shaft horsepower output to a drive shaft 48A driving said electric generator, and an auxiliary power device 46 selectively operable to impart additional shaft horsepower output to the drive shaft 48A driving said electric generator to augment the available shaft horsepower output imparted by the engine 32. It is to be understood that in this embodiment, the auxiliary power apparatus 46 may comprise a compressed air device 50 operable in a first mode as a compressed air engine and in a second mode as an air compressor as in FIG. 3 or a compressed air engine 70 as illustrated in FIG. 4. The engine-auxiliary power apparatus-generator-compressor configuration of the embodiment of FIG. 8 may be used in conjunction with any of the compressed air supply arrangements and compressed air heating arrangements disclosed herein.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

I claim:

1. A transport refrigeration system for refrigerating a perishable cargo within a cargo space of a mobile refrigerated unit, comprising:
   a refrigeration unit having a refrigerant compressor;
   an engine coupled to a drive shaft for powering the refrigerant compressor and operable to generate an available shaft horsepower output;
   a compressed air device operatively associated with the drive shaft for driving the refrigerant compressor and selectively operable to augment the available shaft horsepower output of said engine such that both the engine and the compressed air device provide torque to the drive shaft;
   at least one compressed air storage tank that stores compressed air to power the compressed air device; and
   an engine exhaust gas to compressed air heat exchanger disposed in operative association with said at least one compressed air storage tank for heating said compressed air in-situ within said at least one compressed air storage tank.

2. A transport refrigeration system as recited in claim 1 wherein said compressed air device comprises a compressed air engine.

3. The transport refrigeration system as recited in claim 1 where the compressed air device is selectively operable in a first mode as a compressed air engine to provide torque to the drive shaft and selectively operable in a second mode as an air compressor to provide compressed air to the at least one compressed air storage tank.

4. The transport refrigeration system as recited in claim 3 further comprising a first compressed air conduit establishing air flow communication between an outlet of the least one compressed air storage tank and an inlet to said compressed air device; and a second compressed air conduit establishing air flow communication between an outlet of said compressed air device and an inlet to said at least one compressed air storage tank.

5. The transport refrigeration system as recited in claim 1 wherein the said mobile refrigeration unit has a plurality of wheels, at least one air compressor operatively associated with at least one wheel of said plurality of wheels, said at least one air compressor driven by a braking of said at least one wheel.

6. The transport refrigeration system as recited in claim 1 further comprising an engine exhaust gas to compressed air heat exchanger wherein a supply of compressed air to be supplied to said compressed air engine is heated by a flow of exhaust gases generated by said engine.

7. The transport refrigeration system as recited in claim 1 further comprising:
a compressed air delivery conduit establishing air flow communication between said at least one compressed air storage tank and said compressed air device; and
an engine exhaust gas to compressed air heat exchanger through which a flow of compressed air passing through said compressed air delivery conduit passes in heat exchange relationship with engine exhaust gas provided by said engine.

8. The transport refrigeration system as recited in claim 1 wherein:
said at least one compressed air storage tank comprises a plurality of compressed air storage tanks disposed in a parallel flow arrangement with respect to supplying compressed air to said compressed air device; and
an engine exhaust gas to compressed air heat exchanger is provided in operative association with each tank of said plurality of compressed air storage tanks for heating said compressed air in-situ within each tank of said plurality of compressed air storage tanks.

9. The transport refrigeration system as recited in claim 6 wherein:
said at least one compressed air storage tank comprises a plurality of compressed air storage tanks including a primary compressed air storage tank connected by a compressed air delivery conduit in air flow communication to said compressed air device and at least one secondary compressed air storage tank connected in air flow communication with the primary compressed air storage tank.

10. The transport refrigeration system as recited in claim 9 wherein said at least one secondary compressed air storage tank includes an engine exhaust gas to compressed air heat exchanger arranged in association with said at least one secondary compressed air storage tank for heating compressed air in-situ within said at least one secondary compressed air storage tank.

11. The transport refrigeration system as recited in claim 1, wherein the refrigerant compressor comprises an electric motor, the engine powering the electric motor through an electric generator coupled to the drive shaft.

* * * * *